March 15, 1927.
F. H. DAVIS ET AL
1,620,953
MACHINE FOR SCALING AND GRADING FISH
Filed April 30, 1925    2 Sheets-Sheet 2
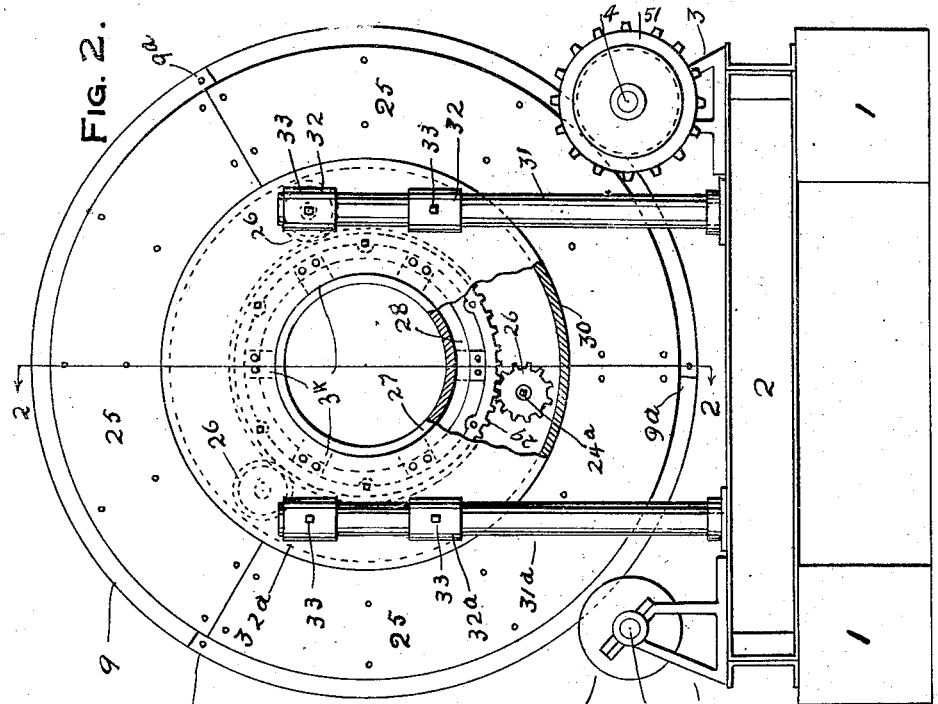
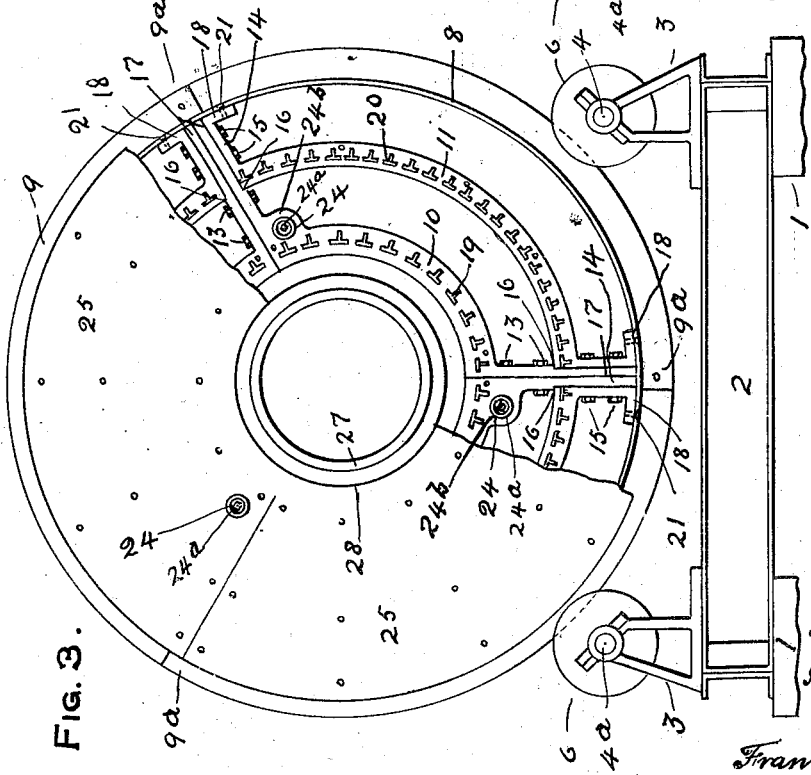
Inventors
Francis H. Davis
and
John W. Klohe
by
Francis H. Davis,
Attorney Patented Mar. 15, 1927.

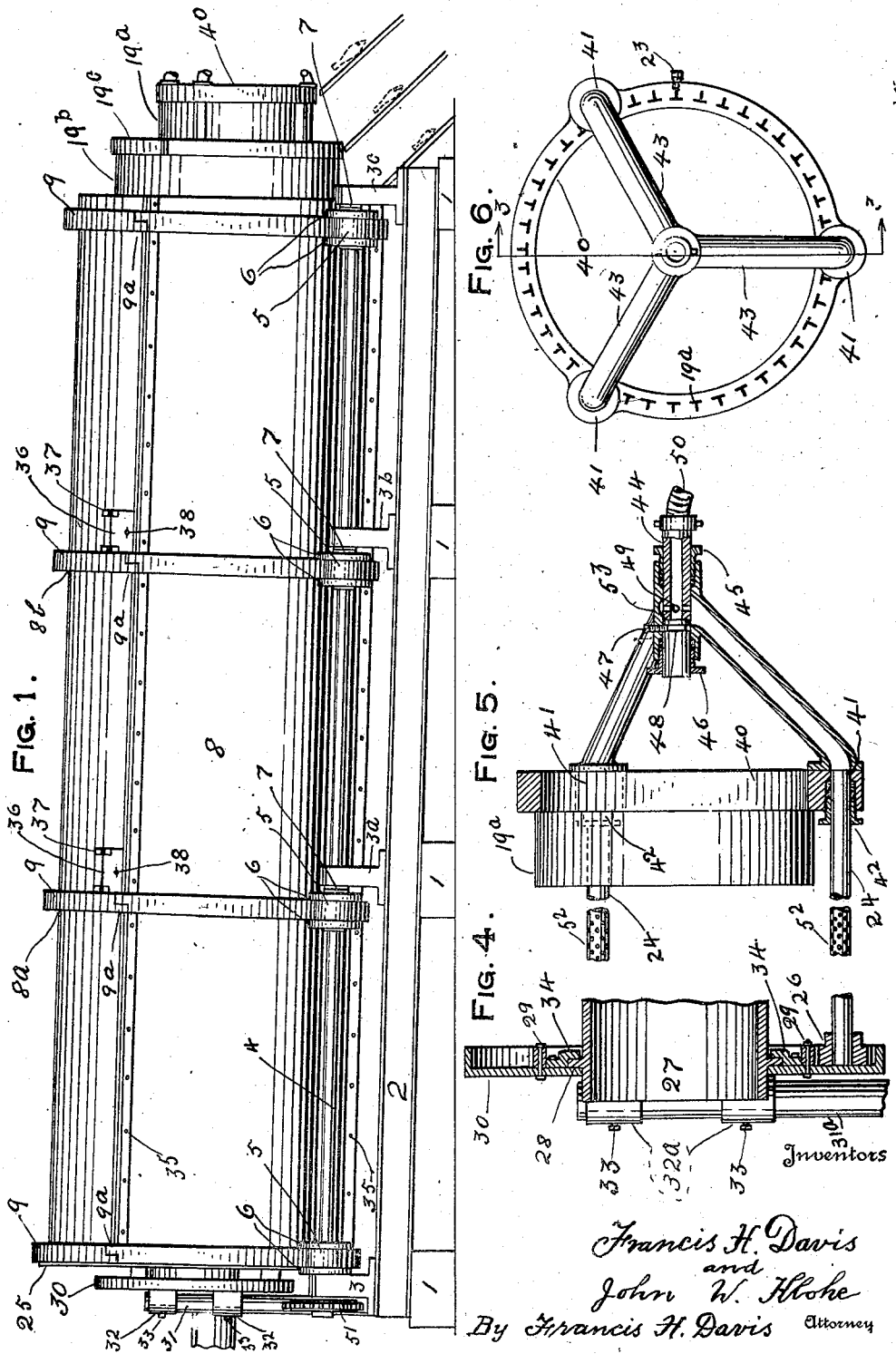

1,620,953

UNITED STATES PATENT OFFICE.

FRANCIS HARLEY DAVIS AND JOHN W. KLOHE, OF MONTEREY, CALIFORNIA; SAID KLOHE ASSIGNOR TO SAID FRANCIS H. DAVIS.

MACHINE FOR SCALING AND GRADING FISH.

Application filed April 30, 1925. Serial No. 26,974.

Our invention relates to improvements in apparatus for grading and scaling fish, and is particularly applicable for operation upon such fish as the Monterey sardine of commerce, a fish averaging approximately from three quarters of an inch, to one and a half inches in thickness; although it is applicable to other fish, and as our machine may also be used for the grading of objects other than fish we therefore do not wish to be restricted to the use of our machine upon fish exclusively.

The chief objects of our invention are; first, to scale fish; and second, to grade them into groups, each group composed of differently sized fish from those composing the other groups, and each individual group composed of comparatively evenly sized fish.

Another object is to provide a series of concentric, longitudinally-slatted cylinders rotating as a unit in an inclined plane, and including certain revolving perforated spray-pipes to play water jets upon the fish while in process of treatment.

A further object is to provide suitable drive means for the spray pipes, and swivel-head connections therefor.

A still further object is to provide an apparatus of segmentary construction, the units whereof may be readily assembled or taken apart.

Another object is the provision of certain slats that can be inserted or removed from the grader wthout having to dismantle the apparatus so to do.

A further object is to reduce the friction of the apparatus against the bearings, and to provide bearings that are adapted to resist the downward and outward thrust of the apparatus.

Other objects are to reduce the expense of packing and to produce a more uniform and attractive product, together with further objects and advantages that will appear.

We attain these objects by the mechanism described in the specification, set forth in the claims and which is illustrated in the accompanying drawings, in which—

Figure 1, longitudinal elevation of the apparatus.

Figure 2, end elevation.

Figure 3, end of apparatus with stationary spur-gear member removed and a plate cut away to expose interior forms.

Figure 4, vertical section of the spur-gear member on line 2—2 of Fig. 2.

Figure 5, longitudinal section through Fig. 6 on line 3—3.

Figure 6, end view of manifold and swivel-head.

Similar numerals designate similar parts thruout the several views of this invention, which hereinafter, for the purpose of this instrument is called the "grader", which term is intended to include both grader and scaler.

To comprehend this invention and its relation to the sardine industry, it should be understood that in order to get the best results when packing, the fish should reach the packers as nearly all of one size as it is possible to grade them, so that by counting the fish while they are being placed in the cans the contents will be near enough to the required weights for all practical purposes.

Graded fish are more economically packed than are fish of mixed sizes, which are frequently packed so that the cans are too light or too full; cans packed too full frequently cause trouble and break-downs to the canning machinery, whereas, cans that are packed too light are undesirable for various other reasons; in either instance the result reflects injuriously on the industry in general, and the brand in particular.

Sardines should be scaled before packing. Hitherto they have been scaled in a separate scaling machine; it is more advantageous to scale and grade the fish at one operation, for the less the fish is handled, consistently with efficient results, the better.

A further reason for grading the fish arises from the needs of mechanical fish-cutting machines which are now coming into use.

In the drawings:—

Fig. 1 shows the slopingly arranged pillars 1 supporting the structural frame 2 at an angle of 10° to the horizontal, more or less. Secured to the frame 2 are the bearings 3, 3ª, 3ᵇ and 3ᶜ, with similar bearings on the opposite side of frame 2, one of which appears in Figs. 2 and 3. In the said bearings run the shafts 4 and 4ª carrying the friction spools 5 provided with the flanges 6; anti-friction bearings 7 are provided between 6 and 3ᵃ, 6 and 3ᵇ, and 6 and 3ᶜ, as well as the similar parts on the opposite side of frame 2.

The body of the grader 8 is banded by the tires 9, the treads of which engage between the flanges 6 of the various friction-spools 5 and are carried thereby, the centers of the said spools 5 being of less distance apart than the diameter of the body 8, as shown in Figs. 2 and 3. The tires 9 are bolted together so as to be assembled or taken apart at the points 9ᵃ, as shown.

The said body 8 is built up on the concentric forms 10 and 11 as shown in the cutaway portions of Fig. 3, the said forms being composed of segmental members. The segments of form 10 are secured together by the bolts 13 and are each provided at their ends with the radially-extending spoke-members 17 and with a shoulder portion 16, each provided further with a transverse bearing member or opening to receive spray-pipe 24, provided further with certain peculiar T-shaped openings 19 passing transversely through the segments for the accommodation of the T-bars or slats 19ᵃ, Fig. 6.

The segments comprising forms 11 are provided with radially-extending portions 14 having corners to fit into shoulders 16 and are adapted to clamp to the spokes 17 by means of the bolts 15, the said form 11 segments being further provided with the lugs 18 and bolts 21 for securing body 8 thereto, being provided also with the T-shaped openings 20 which are similar to, but spaced closer together than, the T-shaped openings 19 of form 10.

In the grader as shown there are four sets of forms as above-described, one in the plane of each tire, but obviously there may be more of them or less.

With the forms 10 and 11 so located within the grader and having the T-shaped openings 19 and 20 in true alignment with one another and with the longitudinal axis of the grader, any one of the T-shaped bars 19ᵃ or 19ᵇ may be pushed into the grader from one end or pulled out therefrom without disturbing any other parts of the associated apparatus. The bars may be held in place by such means as set screw 23, Fig. 6, or any suitable means of detention.

Passing through the entire length of the grader at three points and revoluble in the bearings 24ᵇ are the perforated spray-pipes 24, one in each longitudinal segment of the grader, 24ᵇ being preferably located between form 11 and the inner side of grader body 8.

The intake end of the grader is closed by suitable plate segments 25. Each spray-pipe 24 is provided with a pinion 26 at the intake end of the grader. The said intake end being provided with a cylindrical projecting member 27 upon which is formed the circular flange 28 at right angles thereto.

A suitable distance apart from projection 27 and in axial alignment therewith is the fixed spur-gear 29 which intermeshes with all three pinions 26, gear 29 being carried in a stationary manner by gear-case 30, in turn supported by the standards 31 and 31ᵃ which pass thru the bosses 32 and 32ᵃ that are formed on the outer surface of gear-case 30. The said case 30 being slidable vertically on the said standards affords adjustable regulation between spur-gear 29 and the pinions 26 to compensate for any depression of the intake end of the grader thru wear. The said adjustment being effected by means of the set-screws 33.

Attached to the inner side of case 30 are the cleats 34 which engage behind flange 28, thus securing steadiment for the case 30 while at the same time admitting of smooth rotary movement of the flanged element 28 between the inner surfaces of the cleats 34 and that of the gear-case 30, as shown in Figs. 4 and 2.

Referring now to Fig. 1, it will be seen that the grader can be assembled or taken apart very readily in three major longitudinal sections by means of the outer bolts 35 and the inner bolts as 13 and 15, which latter, in respect to the two end forms 10 and 11 can be reached for manipulation from the outside ends of the grader after having first removed the plate segments 25 from the intake end.

In the case of the two inner forms located transversely at the points 8ᵃ and 8ᵇ, Fig. 1, the bolts 15 which secure them can be gotten at by means of the suitably located doors 36, counterparts of which are located similarly in each longitudinal segment. The bolts 13 however may be reached from the inside of the grader by the removal of a few of the adjacent T-bars 19ᵃ. The doors 36 may be hinged in any suitable manner as 37, Fig. 1, and fastened by any appropriate means, as the thumb-screws 38, or they may be made slidable.

At the outlet end of the grader, which is considerably lower than the intake end, Fig. 1, shows the protruding ends of the two grading cylinders designated as 19ᵃ and 19ᵇ. The extreme end of grading cylinder 19ᵇ is furnished with a circular form 19ᶜ similar to form 11, save that the extensions 17 are cut off flush with the outer circumference of the form. The grading cylinder 19ᵃ however, is furnished on its extreme outlet end with the manifold 40 of peculiar and novel design, illustrated by Fig. 6. On its outer circumference 40 has bearings passing transversely therethru at the three points 41 for the accommodation of the three spray-pipes 24. On the inner face 40 is provided with the packing-gland means 42, Fig. 5. On its outer face 40 is provided with the manifold 43, the ducts whereof register and communicate with each of the spray-pipes 24. Centrally located, in the ductal focus of 43, and in axial alignment with the longitudinal axis of the grader, is the water-swivel head 44 provided with the packing glands 45 and 46, provided also with a suitable detent means as 47 registering with groove 48 to secure correct to and fro adjustment between said 44 and the openings 49 therein with relation to the various ducts 43. Swivel-head 44 being adapted for the attachment of a water hose thereto, preferably a stout armored hose as 50, being adapted to resist the torque on 44 of the rotating grader.

To operate the grader power is applied to sprocket 51, 51 drives shaft 4, 4 drives friction-spools 5, the friction surfaces of 5 coacting with those of 9 rotate the grader, while the idling spools 5 on shaft 4ª assist in supporting the grader and keeping it in adjustment.

The rotation of the grader travels pinions 26 round fixed gear 29, causing 26 to transmit revoluble movement to spray-pipes 24 to which they are rigidly secured.

Fluid is next forced into hose 50 whence it travels thru swivel-head 44, is distributed to the ducts 43 by the ports 49 provided with a jacket-groove 53. From the said ducts, the fluid (presumably sea water) is forced under pressure into spray-pipes 24 whose extremities being closed by plugs 24° compel the water, for the entire length of the grader, to escape in strong sweeping jets thru the perforations 52, Fig. 5. The said jets, coming, as they do, from the space between the inner surface of the grader body 8 and the outer surface of the grading cylinder 19ª impinge from many angles upwardly against the fish, thereby causing them to assume numberless positions, and, assisted by the tumbling action of the grader to rub their scales off and to find suitable openings to fall thru from one grading cylinder to another.

Such action does no injury to the fish as an article of commerce but scales them effectually, and by presenting such numerous opportunities for the smaller fish to slip thru the comparatively widely spaced slat-bars of grading cylinder 19ª into cylinder 19ᵇ, and for the smallest fish to slip thru the still closer slat-bars of 19ᵇ into grader body 8, scale them and grade them into groups of even sizes, the largest fish emerging from cylinder 19ª, medium fish from 19ᵇ and the smallest fish from the grader body 8.

It has been found that T-bars are more applicable than other shapes as the fish will either go thru between them, or in case they are too large to pass thru will fall out again without jamming between the bars, furthermore the leg of the T gives more rigidity to resist pressure than would flat bars.

While we have herein shown and described specific forms of our invention we do not wish to be limited thereto except by such limitations as the claims may import.

What we claim as new and desire to secure by Letters Patent is—

1. A grader comprising a revoluble body, a central intake and a plurality of outlets, the intake being higher above the horizontal plane than the outlets, the said body having a plurality of inner segmental forms disposed in planes at right angles to the longitudinal axis of the body, the said body and the interior forms being adapted for assemblement and dismemberment in longitudinal segmental sections, substantially as described.

2. A revoluble grader, comprising in combination, a central intake, a plurality of outlets, said outlets being lower than the intake, inner segmental forms disposed transversally to the longitudinal axis of the body, the said body and interior segmental forms being adapted to be secured together or be taken apart in longitudinal sections.

3. A grader comprising a sectional revoluble imperforate body, segmental forms disposed transversally therein and having their lines of parting co-incident with the longitudinal partings of the grader body, a plurality of slatted grading elements nested within the body and adapted to revolve therewith.

4. A grader, comprising in combination, a sectional revoluble imperforate body, segmental forms disposed transversally at suitable distances apart within the body, the transverse joints of the segments being co-incident with the longitudinal joints of the body, and a plurality of nested grading elements within the body, substantially as described and for the purpose set forth.

5. In a grader comprising a revoluble body and interior forms adapted to revolve therewith, the said forms and body being adapted for assemblement or dismemberment sectionally and provided with suitably-spaced slat-bars insertable and removable longitudinally of the grader, substantially as described.

6. A revoluble grader, comprising in combination, a sectional body whose members have longitudinal joints, transverse forms interiorly disposed, the said forms being segmentally divided and having their joints approximately co-incident with the longitudinal joints of the body and the said forms provided with suitably-spaced grading means, the said means being removable.

7. A sectional revoluble grader, comprising in combination, a sectional body, sectional interior forms adapted to part with the longitudinal partings of the body, interior nested grading units, grading openings in the wall of each unit, the said openings being of diminished width as the units extend outwardly from the central axis of the grader.

8. In a sectional revoluble grader, transverse internal forms each having a plurality of T-shaped perforations crosswise of the forms, the said perforations suitably spaced apart and being adapted to carry T-shaped slat-bars, substantially as described and for the purpose set forth.

9. A sectional revoluble grader, comprising in combination, interior transverse forms having suitably spaced T-shaped perforations crosswise of the forms, and slat-bars carried thereby, the said bars thus forming slatted walls for a plurality of nested grading elements.

10. In a tilted revoluble grader having a plurality of grading units one within the other, spray-pipes adapted to play fluid against the objects being graded, the said fluid playing upwardly against the said objects.

11. A revoluble grader, comprising in combination, a tilted body, nested grading units within the body and a fluid spray-means carried by the body and adapted to spray fluid from behind the grading units toward the central axis of the grader, substantially as described.

12. In a tilted revoluble grader, an outer body, a plurality of suitable grading units within the body and within each other, and revoluble spray-means carried by the grader.

13. A tilted revoluble grader having an intake and outlets, comprising in combination, a plurality of nested grading units within the body and revoluble spray-means within the body.

14. A revoluble grader, spray pipes carried by the grader and revoluble therein, a transmission member on said pipes, the said member contacting with a fixed member whereby the rotary movement of the grader imparts rotary movement to the said spray-pipes.

15. A revoluble grader, comprising in combination, spray-pipes revoluble in the grader and revolvable therewith, a transmission member on the pipes, the said member coacting with a fixed member whereby the rotary movement of the grader imparts rotary movement to the said spray-pipes, substantially as described.

16. A rotary grader, comprising in combination, an outer body, inner grading units or unit, spray means and drive means to rotate the said spray means.

17. A grader including a hollow body, grading means in said body, spray pipes extending longitudinally within the body and mounted for revolution on their axes, a stationary gear mounted at one end of the grader, pinions fixed on the spray pipes and meshing with the gear, and means to rotate the grader on its axis.

18. A grader including a hollow body, grading means in said body, spray pipes extending longitudinally within the body and mounted for revolution on their axes, a stationary gear mounted at one end of the grader, pinions fixed on the spray pipes and meshing with the gear, means to rotate the grader on its axis, a manifold having a central pipe and branch pipes extending from the central pipe and communicating with the spray pipes, and a supply pipe swiveled to the central pipe.

19. In a segmental rotary grader comprising interior forms and having inaccessible bolt-means, door-means of gaining access to the said bolt-means, substantially as described.

20. In a segmental grader having inaccessible interior fastenments, the combination therewith, of suitable access-doors, substantially as described and for the purpose set forth.

21. In a multiple, segmentary grader having nested grading elements therein, rotary spray-pipes and means of rotation therefor, a common intake means of supply for all of the grading elements, separate means of distribution from each grading element and fluid supply means for the said spray pipes.

22. A revoluble grader body, revoluble spray pipes extending longitudinally within the body, a cylindrical member projecting centrally from the intake end of the grader, a flange member on the projecting member and at right angles thereto, a stationary gear at one end of the grader, pinions fixed on the spray pipes and meshing with the gear to revolve the spray-pipes, cleats having slidable contact between the said flange and the gear, the said cleats being adapted to afford adjustable regulation between the grader and the said gear.

In testimony, that we claim the foregoing as our own, we have hereto affixed our signatures in the presence of two witnesses.

FRANCIS H. DAVIS.
JOHN W. KLOHE.